United States Patent [19]

Takenaka

[11] Patent Number: 5,148,008

[45] Date of Patent: Sep. 15, 1992

[54] MARK READING DEVICE WITH CYCLICLY VARYING POWER

[75] Inventor: Shinya Takenaka, Osaka, Japan

[73] Assignee: Sumitomo Electric Industries, Ltd., Osaka, Japan

[21] Appl. No.: 789,803

[22] Filed: Nov. 12, 1991

Related U.S. Application Data

[63] Continuation of Ser. No. 460,523, Jan. 3, 1990, now Defensive Publication No.

[30] Foreign Application Priority Data

Jan. 10, 1989 [JP] Japan ................ 1-4015

[51] Int. Cl.⁵ ............ G06K 7/10; H01J 3/14; H01J 5/16; H01J 40/14
[52] U.S. Cl. ................. 235/455; 235/472; 250/235; 359/196; 359/217
[58] Field of Search ......... 235/454, 455, 462, 472; 369/116; 250/235, 236, 566, 568; 350/6.2, 6.4; 372/38

[56] References Cited

U.S. PATENT DOCUMENTS

| | | | |
|---|---|---|---|
| 4,315,245 | 2/1982 | Nakahara et al. | 235/455 |
| 4,481,667 | 11/1984 | Price et al. | 235/455 |
| 4,677,287 | 6/1987 | Ejima | 250/235 |
| 4,820,911 | 4/1989 | Arackellian et al. | 235/467 |
| 4,894,817 | 1/1990 | Tanaka et al. | 235/454 |
| 4,933,538 | 6/1990 | Heiman et al. | 235/462 |

*Primary Examiner*—Stuart S. Levy
*Assistant Examiner*—Christopher R. Glembocki
*Attorney, Agent, or Firm*—Cushman, Darby & Cushman

[57] ABSTRACT

A mark reading device that reads marks such as a bar code, or the like on a remote surface. A laser beam is outputted, deflected through a scan angle and the reflected energy is read at a detector. This energy is processed and converted to a usable format for input into a computer, cash register, or any type of data collection device. The present invention improves depth of field and readability by varying the output energy of the laser after each successive scan, thus providing a range of energy levels at the detector.

2 Claims, 3 Drawing Sheets

MARK READING DEVICE WITH CYCLICLY VARYING POWER

This is a continuation of application Ser. No. 07/460,523, filed on Jan. 3, 1990, which was abandoned upon the filing hereof.

BACKGROUND OF THE INVENTION

1. Field of The Invention

The present invention relates to a mark reading device in which the output beam of a laser oscillating device is applied to an object to scan the surface thereof. The laser beam reflected therefrom is received, at a light detection device, to read marks such as characters, bar codes, or the like.

2. Description of Related Art

The recent widespread use of computers has spurred the development and use of input devices such as character readers, bar code readers and the like. Such input devices are typically held in the operators hand for convenience and flexibility. Because of this, exact positioning and orientation are not possible. Thus, the reading device must be able to read over a wide range of distances and orientation angles to be reliable and practical. Previous mark reading devices have proved unreliable at reading surfaces at varying distances and angles. The laser output energy of such devices is fixed while in the scan mode. Consequently, the energy of laser light received at the detector is a function of the distance between the reading device and the surface to be read and the incident angle of the surface relative to the laser beam. When such a device is too close to the surface that is to be read the detection device is saturated and the device fails to function. When the same device is too far away from, or at a high angle to, the surface that is to be read the reflected signal at the detection device is too low and again the device fails.

The typical mark reading device found in the prior art consists of a laser oscillating device, a rotatable mirror for deflecting the laser beam output of the oscillating device through a predetermined scan angle, a light detection device for receiving the reflected laser beam and signal processing circuitry. The above elements can be incorporated into a stationary housing, a portable housing such as a "gun" configuration, or the like.

SUMMARY OF THE INVENTION

The object of the present invention is to provide a mark reading device that will read bar codes, characters, or the like quickly and reliably at varying distances and angles of incidence. This objective is achieved by varying the output energy of the laser oscillating device after each scan so that an acceptable signal is received at the light detection device. A scan detection device is incorporated to send a signal to a controller indicating the end of each scan of the laser beam. In turn, the controller will change the output energy of the laser oscillating device, in a predetermined manner, after each deflection of the beam. The variance of laser energy over several deflections, or scans, insures that a readable signal has been received at the light detection device during at least one scan.

The nature, principle, and utility of the present invention will become apparent from the following detailed description of its operation and the accompanying drawings.

DETAILED DESCRIPTION OF THE PREFERRED EMBODIMENT

Figure 1:
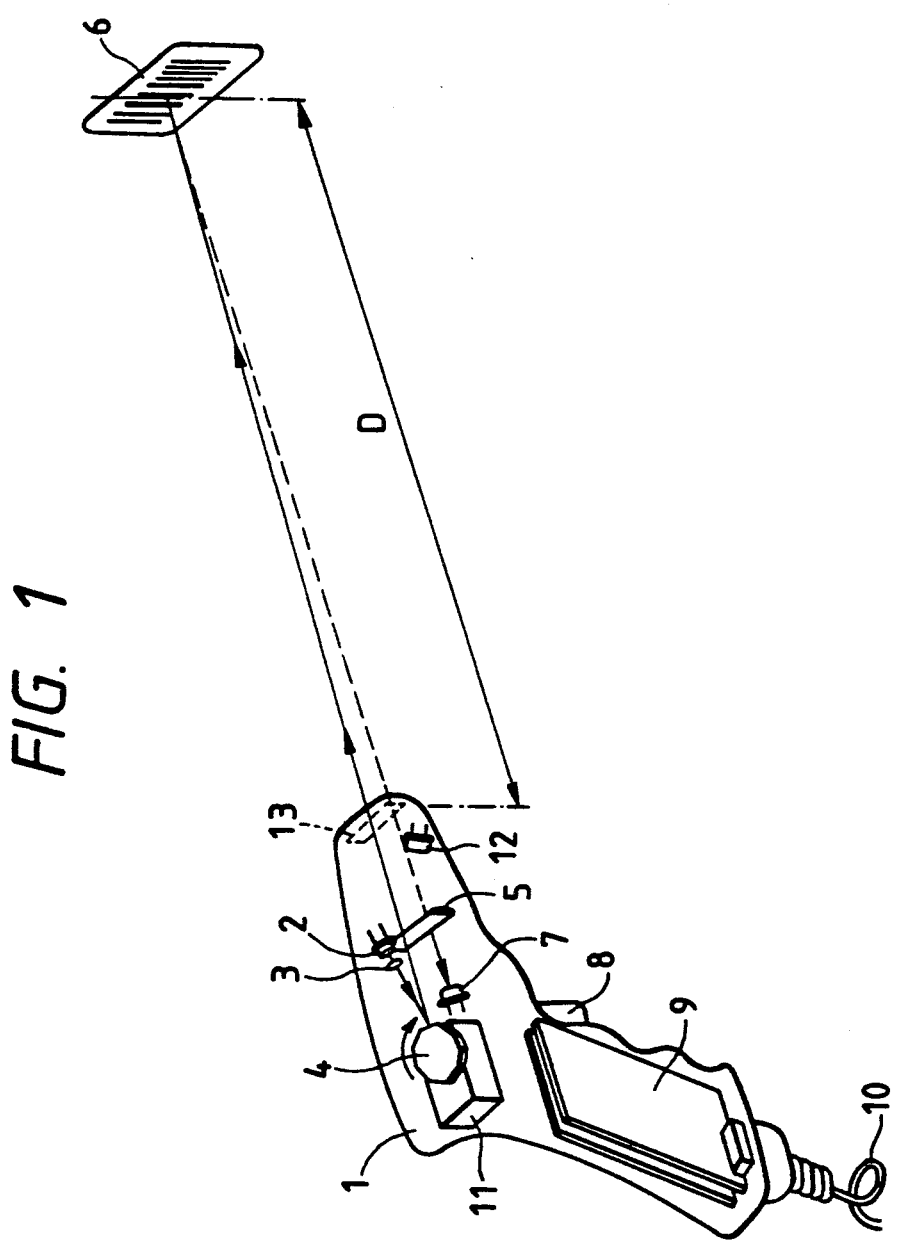
FIG. 1 is a perspective view of one embodiment of the present invention in a "gun" style.

FIG. 1 illustrates a preferred embodiment of the present invention in a hand held "gun" type of device. When the trigger 8 is depressed a motor 11 is driven to rotate a polygon mirror 4. Simultaneously, the laser oscillating device 2 outputs a laser beam. The laser beam thus outputted, through corrective lens 3 is reflected by the surfaces of the mirror 4, which is rotating, and the laser beam is thusly deflected through a scan angle in the scanning mode. The mirror 4 could also be of a single surface and the motor 11 of an oscillating type. The present invention encompasses any method of moving a laser beam through a scan angle, of which many are known in the prior art. The laser beam deflected off of the mirror 4 passes through opening 13 to the surface 6 that is to be read and is reflected thereby concentrated by lens 5 and received by a light detection device 7 in the mark reading device. The light detection device 7 outputs a signal proportional to the energy of the reflected laser light. This signal is conditioned and processed, in the processing circuit 9, into a standard, usable signal for input into a computer, cash register, or the like through cable 10. Please note that corrective lens 3 and lens 5 may be of types well known in the art and are utilized as necessary for optical manipulation of the beam.

Figure 2:
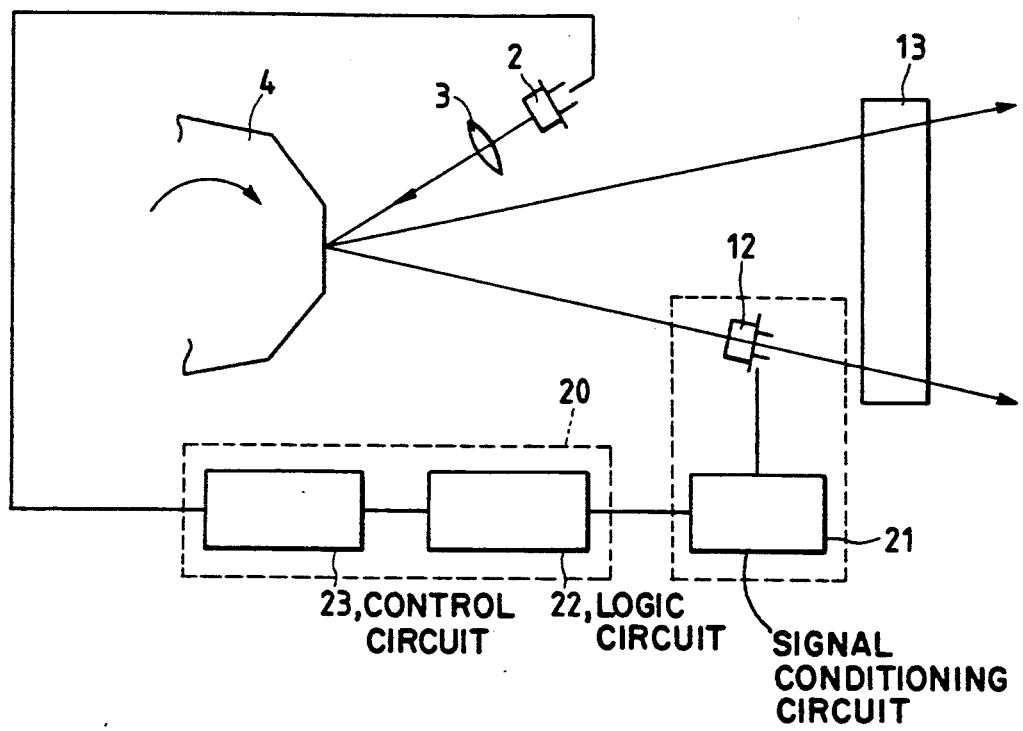
FIG. 2 is a diagram illustrating a typical arrangement of a controller for controlling the output of a laser oscillating device in response to a signal from a scan detecting light receiving element.
Figure 3A:
FIG. 3(A) is a graph illustrating a typical output signal of the scan detecting element, verses time, during scan mode in the present invention.

FIG. 2 illustrates a block diagram of a circuit used to vary the output of the laser oscillating device 2 in response to a scan termination signal. The scan detection device element 12 is a light detecting device, such as a photocell. The output of the laser oscillating device 2 is moved through the predetermined scan angle as a result of deflection off of the rotating mirror 4. Whenever receiving the laser beam the scan detection device 12 outputs a pulse-like scan detection signal as shown in FIG. 3(A). This signal may be amplified and conditioned as necessary by a signal conditioning circuit 21. The output of the signal conditioning circuit 21 is then directed to a logic circuit 22 that converts the pulses, corresponding to scan terminations, into a predetermined (or preprogrammed) set of control instructions for input into the control circuit 23. The combination of the logic circuit 22 and the control circuit 23 may be defined as the controller 20.

Figure 3B:
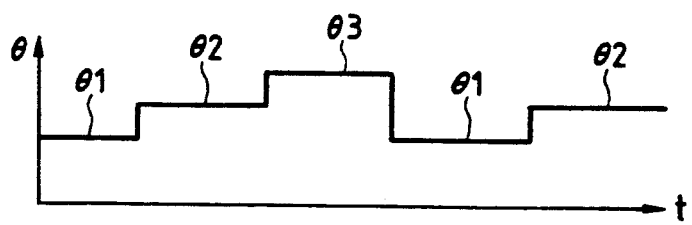
FIG. 3(B) is a graph illustrating a typical output signal from the controller, verses time, during scan mode in the present invention.
Figure 3C:
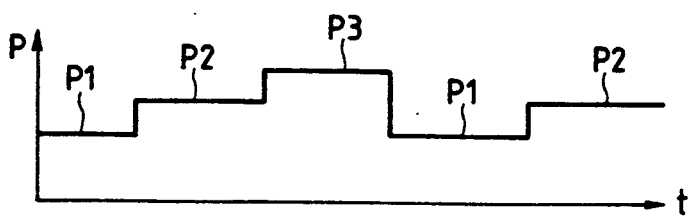
FIG. 3(C) is a graph illustrating typical output energy levels of the laser oscillating device, verses time, during scan mode in the present invention.

The output of the controller 20 is a step-like curve of varying control data to the laser oscillating 2 device where each successive step corresponds to a scan termination as seen in FIG. 3(B). Note however, that the control data to the laser oscillating device 2 is constant over the period of each scan. This data may be any type of physical or electrical control data such as voltage, current, binary data, or the like. The output power of the laser oscillating device 2 is proportional to the control data received from the controller 20. As a result, the output power of the laser is also a step-like function where each successive step corresponds to a scan termination as seen in FIG. 3(C). Because the output power of the laser oscillating device 2 is varied in this manner the reflected beam received by the light detection device element 7 is likely to be of an acceptable energy level for a proper read without the necessity of moving the reading device.

The magnitude of the control data and the number of step-like transitions may be selected to maximize readability and minimize time between reads depending on the range of distances to be read. One possible example is illustrated in FIG. 3(B) and FIG. 3(C) where control data 81 corresponds to a laser output power of Pl that is lower than the usually set laser output, control data $\theta$2 corresponds to a laser output power P2 that is equal to the usual laser output value, and control data $\theta$3 corresponds to a laser output value P3 that is higher than the usual laser output value. Most laser oscillating devices in use today are capable of an output energy higher than the usual output energy value. Selecting such an output energy continuously can reduce the life of the laser. In the present invention the higher laser output energy will be intermittent and will come only after a period of lower laser cutput values. This method of operation should not significantly reduce the life of most laser oscillating devices. The actual values of the control data and the laser output are readily determined by one skilled in the art with a minimum of experimentation or calculation.

Figure 4A:
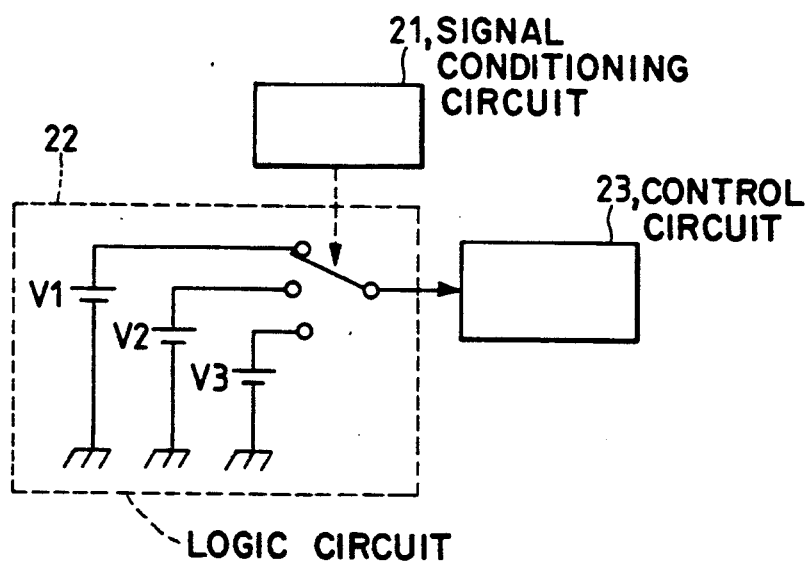
FIG. 4(A) is a diagram illustrating an example of a logic circuit.

FIG. 4(A) illustrates one method that may be employed in the logic circuit 22. A switching operation is carried out in response to the scan detection signal from the signal conditioning circuit 21. Each scan detection signal operates the switching operation so as to different drive voltages to the control circuit 23. Of course the number of different voltages and their magnitudes will be selected for the specific application.

Figure 4B:
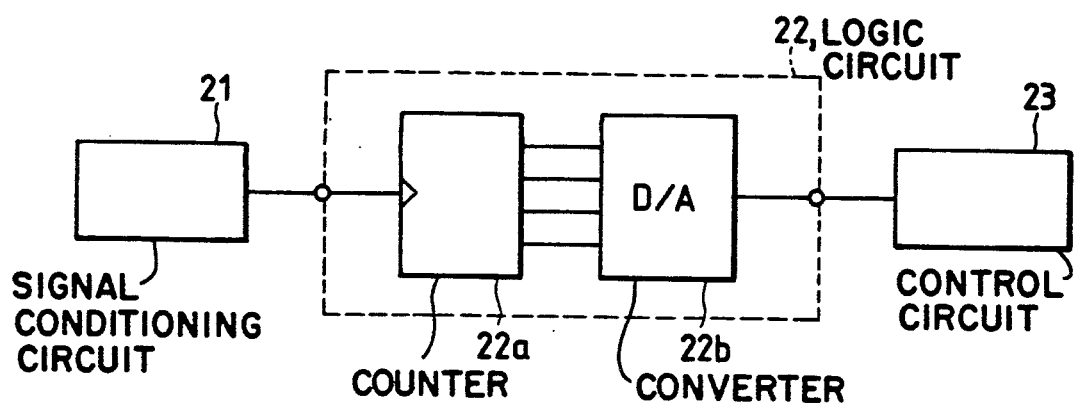
FIG. 4(B) is a diagram illustrating another example of a logic circuit.

FIG. 4(B) illustrates another possible method that may be employed in the logic circuit. In this case the logic circuit is made up of a counter 22a and a digital to analog converter 22b. The counter 22a counts a specified plurality of scan detection signals and its output count is directed to the digital to analog converter 22b which outputs a corresponding signal to the control circuit 23. After the specified plurality of scan detection signals is detected, (e.g. 3) the counter is automatically reset and counting begins again.

While a preferred embodiment of the present invention is described above it will be obvious to those skilled in the art that various modifications may be made therein without departing from the scope and spirit of the present invention.

What is claimed:

1. A mark device comprising:
   a laser oscillating unit outputting a laser beam;
   deflecting means for cyclicly deflecting said laser beam through a predetermined scan angle to an abject surface;
   receiving means for reading said laser beam upon reflection from said object surface;
   scan detecting means for outputting a scan termination signal after each of said cyclical defections of said laser beam by said deflecting means; and
   controller means for varying output energy of said laser beam in response to said scan termination signal, said controller means varying said output energy by a step in response to each of said scan termination signals, said output energy, emitted between receipt of any two consecutive scan termination signals by said controller means, having a constant magnitude independent of an amount of laser beam energy reflected from said object surface.

2. A mark reading device as in claim 1, wherein
   at least one of said steps corresponds to an energy level lower than a typically set laser output energy level;
   at least one of said steps corresponds to an energy level equal to said typically set laser output energy level; and
   at least one of said steps corresponds to an energy level higher than said typically set laser output energy level.

* * * * *